Oct. 12, 1954   J. MEYER ET AL   2,691,266
WIND GUARD ATTACHMENT FOR PICKUP DEVICES
Filed March 23, 1953   2 Sheets-Sheet 1

Joseph Meyer
Joe H. Volk
INVENTOR.

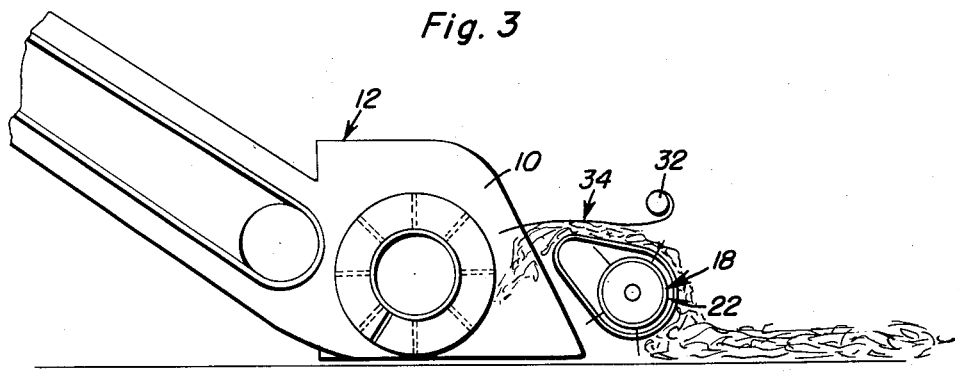
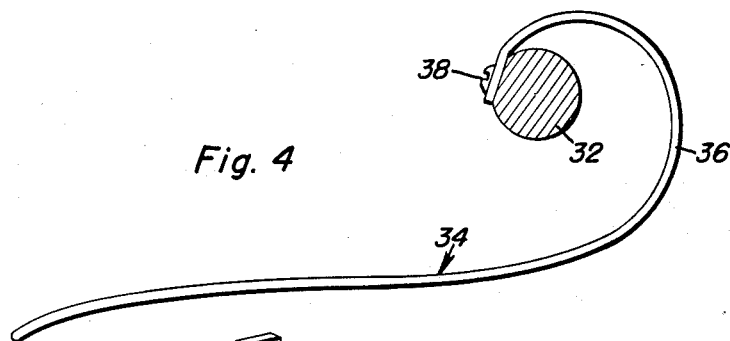
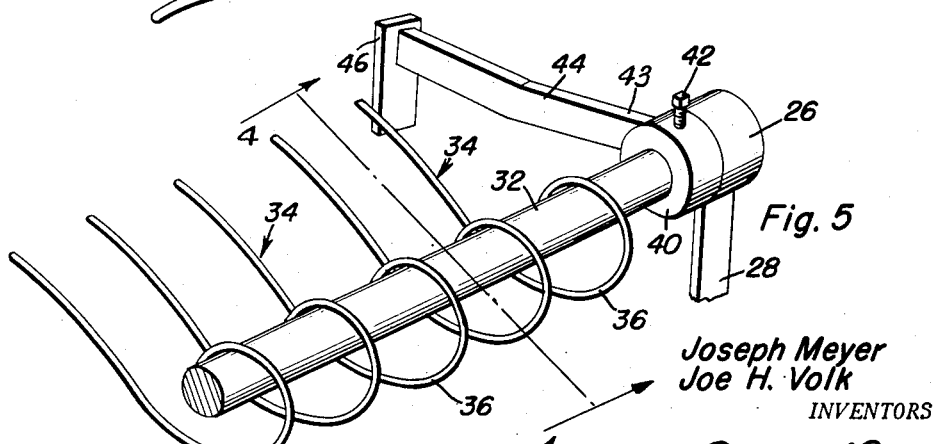
Joseph Meyer
Joe H. Volk
INVENTORS

Patented Oct. 12, 1954

2,691,266

UNITED STATES PATENT OFFICE 2,691,266

WIND GUARD ATTACHMENT FOR PICKUP DEVICES

Joseph Meyer and Joe H. Volk, Rugby, N. Dak.; said Meyer assignor to said Volk

Application March 23, 1953, Serial No. 344,068

1 Claim. (Cl. 56—364)

This invention relates to new and useful improvements in combines and the primary object of the present invention is to provide a wind guard attachment for the pick-up device of a combine that will guide and confine material being directed to the feeding means of the combine from the pick-up device of the combine.

Another important object of the present invention is to provide a guiding and confining attachment for a pick-up device that is quickly and readily attached to or removed from the pick-up device and which will effectively guide and confine crop being directed into the feeding means of a combine.

A further object of the present invention is to provide a crop guiding and confining attachment for pick-up devices including novel and improved adjusting means whereby the rearwardly extending tines of the attachment may be selectively raised and lowered with respect to the pick-up device on which it is mounted thereby permitting the attachment to be used for handling different crops or crops of different volume.

A still further object of the present invention is to provide an attachment of the aforementioned character that is extremely simple and practical in construction, strong and reliable in use, efficient and durable in operation, and inexpensive to manufacture, assemble and maintain, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a diagrammatic side view showing the manner in which crops are guided by the attachment as the crop is directed by the pick-up device toward the feeding means of the combine;

Figure 4 is an enlarged vertical sectional view of the tine supporting shaft taken on the line 4—4 of Figure 5 and showing a tine attached thereto; and, Figure 5 is an enlarged fragmentary perspective view of the present invention to show the manner in which the tine supporting shaft is mounted upon the combine and retained in a selected rotated position.

Figure 1:
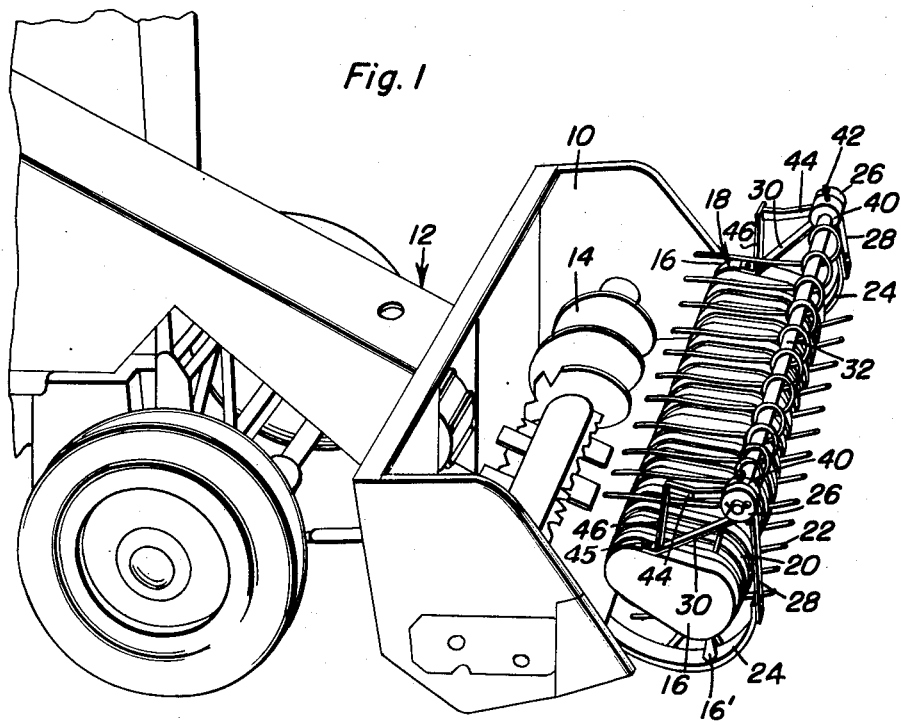
Figure 1 is a fragmentary perspective view of a conventional combine and showing the present invention mounted thereon.

Referring now to the drawings in detail, wherein for the purpose of illustration, there is disclosed a preferred embodiment of the present invention, the numeral 10 represents the frame and housing structure of a well known combine 12 on which there is supported a feeding means 14 such as an auger. The end portions 16 of a pick-up device 18 are supported on the frame and housing structure 10 in front of the feeding means 14 and includes spaced bands 20 between which projecting pick-up teeth 22 operate for engaging the crop and delivering the crop to the feeding means 14.

The end portions 16 of the pick-up device 18 are suitably fixed, as at 16', to curved ground skids 24 which are suitably fixed to the frame and housing structure 10.

The present invention does not attempt to claim the above combine but is merely an attachment therefor that will confine and guide material being directed to the feeding means 14 from the pick-up device 18 as the latter rakes up the crop, such as grain on the ground. This attachment will prevent the crop from being blown over a field as the crop is being delivered to the feeding means 14 by the pick-up device 18.

Figure 2:
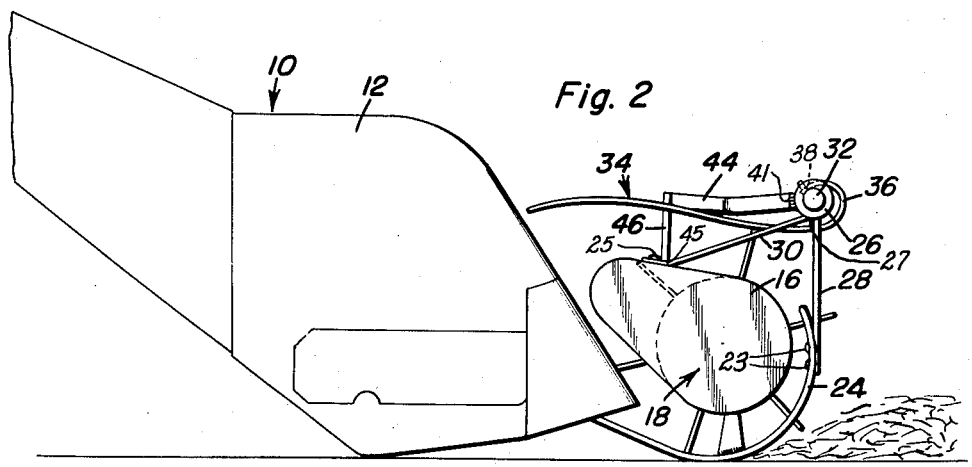
Figure 2 is a side elevational view of Figure 1.

To accomplish the desired results, there is provided a pair of aligned horizontal bearings 26 that overlie the end portions 16 of the pick-up device 18. Forward and rear rigid mounting straps 28 and 30 are fixed by welding 27 or the like to the bearings 26 and these straps are bolted to the skids 24 and, as at 25, to the end portions 16 respectively, to support the bearings 26 above the forward portion of the pick-up device 18 as shown in Figure 2.

The ends of a horizontal tine holding shaft 32 are disposed in the bearings 26. The shaft 32 supports a plurality of longitudinally spaced rod elements or tines 34 extending rearwardly therefrom and each of which is provided with a hooked front end portion 36 that hooks over the shaft 32. The tines 34 extend rearwardly from said portions 36 under the shaft 32 and over the pick-up device 18 and terminate relatively close to the feeding means 14.

Tines 34 may be fixed to shaft 32 by having the hooked front end portions 36 thereof removably secured to shaft 32 by fasteners 38 so that individual tines may be replaced when desired. The hooked front end portions 36 of the tines add resiliency to the tines so that the same may yieldingly engage crops being directed to the feeding means by the pick-up device 18.

Means is provided for retaining the shaft 32 in a selected rotated position to selectively raise and lower the tines 34 so that the same may be employed with different crops and crops of different volume. This means comprises a pair of collars 40 that are held on the end portions of shaft 32 by set screws 42. The front ends 43 of rearwardly extending arms 44 are fixed by welding 41 or the like to the collars 40 and fixedly support depending rigid abutment straps 46 that engage the rear ends 45 of mounting straps 30.

Although the tines 34 are located relatively close to the pick-up device, tines 34 are so disposed as to clear the teeth 22 so that the teeth 22 will not be restricted during their rearward movement toward the feeding means 14.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A wind guard attachment for a harvester pick-up device of the type having end portions attached to end ground skids at opposite ends of the device, said attachment comprising a horizontal shaft extending endwise along and above said device and provided with horizontal lateral tines thereon overlying the device, a pair of bearings for the ends of the shaft in which said shaft is rotatably adjustable to raise and lower said tines, each bearing being provided with a pair of depending, relatively diverging supporting straps, the straps of the pairs being attached to the end portions and skids, respectively, at opposite ends of said device, a pair of set collars on said shaft adjacent the pair of bearings provided with horizontal arms terminating in depending terminal abutment straps engageable with the straps attached to said end portions to hold said shaft in adjusted position.

References Cited in the file of this patent

UNITED STATES PATENTS

| Number | Name | Date |
|---|---|---|
| 76,952 | Squier | Apr. 21, 1868 |
| 468,446 | Brooks | Feb. 9, 1892 |
| 2,458,713 | Linderer | Jan. 11, 1949 |
| 2,571,489 | Russell | Oct. 16, 1951 |